(12) United States Patent
Nakamura et al.

(10) Patent No.: US 7,097,697 B2
(45) Date of Patent: Aug. 29, 2006

(54) FUEL VAPOR TREATMENT DEVICE

(75) Inventors: Tsuyoshi Nakamura, Saitama (JP); Souichirou Kaku, Saitama (JP); Hideyuki Matsushima, Kanagawa (JP)

(73) Assignees: Mahle Filter Systems Japan Corporation, Tokyo (JP); Nissan Motor Co., Ltd., Yokohama (JP)

( * ) Notice: Subject to any disclaimer, the term of this patent is extended or adjusted under 35 U.S.C. 154(b) by 403 days.

(21) Appl. No.: 10/629,740

(22) Filed: Jul. 30, 2003

(65) Prior Publication Data

US 2005/0204924 A1   Sep. 22, 2005

(30) Foreign Application Priority Data

Jul. 31, 2002   (JP)   ............... 2002-222763

(51) Int. Cl.
 *B01D 53/02*   (2006.01)
 *F02M 25/08*   (2006.01)
(52) U.S. Cl. ............... 96/134; 96/139; 96/147; 123/519
(58) Field of Classification Search ............ 96/108, 96/121, 134, 135, 139, 147, 152; 123/518, 123/519, 520, 521
See application file for complete search history.

(56) References Cited

U.S. PATENT DOCUMENTS

| | | | | |
|---|---|---|---|---|
| 4,496,379 A | * | 1/1985 | Kozawa | ............ 96/130 |
| 4,717,401 A | * | 1/1988 | Lupoli et al. | ............ 96/141 |
| 4,750,923 A | * | 6/1988 | Haruta et al. | ............ 96/141 |
| 4,877,001 A | * | 10/1989 | Kenealy et al. | ............ 123/519 |
| 5,058,693 A | * | 10/1991 | Murdock et al. | ............ 180/69.4 |
| 5,207,808 A | * | 5/1993 | Haruta et al. | ............ 96/131 |
| 5,337,721 A | * | 8/1994 | Kasuya et al. | ............ 123/519 |
| 5,840,104 A | * | 11/1998 | Hashimoto et al. | ............ 96/135 |

FOREIGN PATENT DOCUMENTS

| | | |
|---|---|---|
| JP | 11-200963 A | 7/1999 |
| JP | 2001-317418 A | 11/2001 |
| JP | 2001-323846 A | 11/2001 |

\* cited by examiner

*Primary Examiner*—Frank M. Lawrence
(74) *Attorney, Agent, or Firm*—Foley & Lardner LLP

(57) ABSTRACT

A fuel vapor treatment device for an automotive vehicle includes a casing having a charge port connected to a fuel tank, a purge port connected to an intake side of an engine, and an atmospheric air port through which atmospheric air is introduced. Fuel vapor adsorbing material is filled in the casing. A filter is disposed in the casing and between the atmospheric air port and the fuel vapor adsorbing material to trap dust contained in atmospheric air. A baffle plate is disposed in the casing and between the atmospheric air port and the filter to change flow of atmospheric air introduced through the atmospheric air port into a generally radial direction. Additionally, an annular space is formed around the baffle plate so that atmospheric air from the baffle plate flows through the annular space to the filter.

13 Claims, 7 Drawing Sheets

FUEL VAPOR TREATMENT DEVICE

BACKGROUND OF THE INVENTION

This invention relates to improvements in a fuel vapor treatment device configured to adsorb fuel vapor from a fuel tank and the like of an automotive vehicle and release the adsorbed fuel to be combusted in an engine during operation of the engine.

In general, a fuel vapor treatment device or canister of this type includes a casing which is formed with a charge port connected to the fuel tank, a purge port connected to an intake side of the engine, and an atmospheric air port through which atmospheric air is introduced. A fuel vapor adsorbing material such as activated carbon or the like is filled inside the casing. The adsorbing material is isolated from atmospheric air introduced from the atmospheric air port by a filter, and therefore dust contained in atmospheric air is trapped by the filter.

Now, in the fuel vapor treatment device of this kind, the amount of dust trapped in the filter gradually increases with lapse of time so that the filter may be clogged. In case that severe clogging of the filter occurs, a flow resistance between the atmospheric air port and the purge port increases during purging of fuel vapor adsorbed in the adsorbing material, thereby making it impossible to sufficiently purge the fuel vapor out of the fuel vapor treatment device.

In view of the above, Japanese Patent Provisional Publication No. 11-200963 proposes such a device that the cross-sectional area (perpendicular to the axis) of the filter on the side of the atmospheric air port is enlarged relative to the cross-sectional area of a section filled with the adsorbing material. Also in this case, the filter may be clogged when a large amount of dust is sucked through the filter.

In order to cope with the above problems, Japanese Patent Provisional Publication Nos. 2001-317418 and 2001-323846 propose the following fuel vapor treatment devices: A passage arrangement is provided in such a manner as to suck atmospheric air from the lower side of a filter so that dust adhered to the filter is dropped under the action of gravity, engine vibration and the like and removed.

SUMMARY OF THE INVENTION

However, in case of using such conventional fuel vapor treatment devices, it is necessary to install them at such a posture that a surface through which atmospheric air is sucked is positioned at a vertically lower side when the devices are mounted on a vehicle. Accordingly, if the devices are installed at their lateral posture or inclined posture, a sufficient dust removing effect cannot be obtained. Additionally, the conventional fuel vapor treatment devices have a bent passage which leads from the atmospheric air port to the filter, and therefore it may be assumed that dust contained in atmospheric air can be adhered to the inner surface of the bend passage so as to be removed when the atmospheric air introduced through the atmospheric air port changes its flow direction within the bent passage. However, the inside of the bent section of the passage is smaller in cross-sectional area, and therefore a flow speed in the bent section is high thereby making it impossible to expect a sufficient dust removing effect.

Furthermore in the conventional fuel vapor treatment devices, a passage from the atmospheric air port extends to communicate with a space below the filter through a portion which is one-sided to the periphery of the filter. Consequently, dust sucked through the atmospheric air port is concentrated at the above portion of the filter, thereby causing a partial clogging of the filter.

It is, therefore, an object of the present invention to provide an improved fuel vapor treatment device which can effectively overcome drawbacks encountered in conventional fuel vapor treatment devices.

Another object of the present invention is to provide an improved fuel vapor treatment device which can maintain the performance of the device throughout a long time use without being affected by its install posture.

A further object of the present invention is to provide an improved fuel vapor treatment device which is configured to effectively prevent a filter used therein from being clogged with dust throughout a long time use.

A still further object of the present invention is to provide an improved vapor treatment device in which atmospheric air containing dust is subjected to its flow direction change prior to be passed to a filter, thereby separating considerable dust in atmospheric air before filtering by the filter.

According to the present invention, a fuel vapor treatment device comprises a casing having a charge port connected to a fuel tank, a purge port connected to an intake side of an engine, and an atmospheric air port through which atmospheric air is introduced. Fuel vapor adsorbing material is filled in the casing. A filter is disposed in the casing and between the atmospheric air port and the fuel vapor adsorbing material to trap dust contained in atmospheric air. A baffle plate is disposed in the casing and between the atmospheric air port and the filter to change flow of atmospheric air introduced through the atmospheric air port into a generally radial direction. Additionally, an annular space is formed around the baffle plate so that atmospheric air from the baffle plate flows through the annular space to the filter.

BRIEF DESCRIPTION OF THE DRAWINGS

In the drawings, like reference numerals designate like parts and elements throughout all figures, in which.

DETAILED DESCRIPTION OF THE INVENTION

Figure 1:
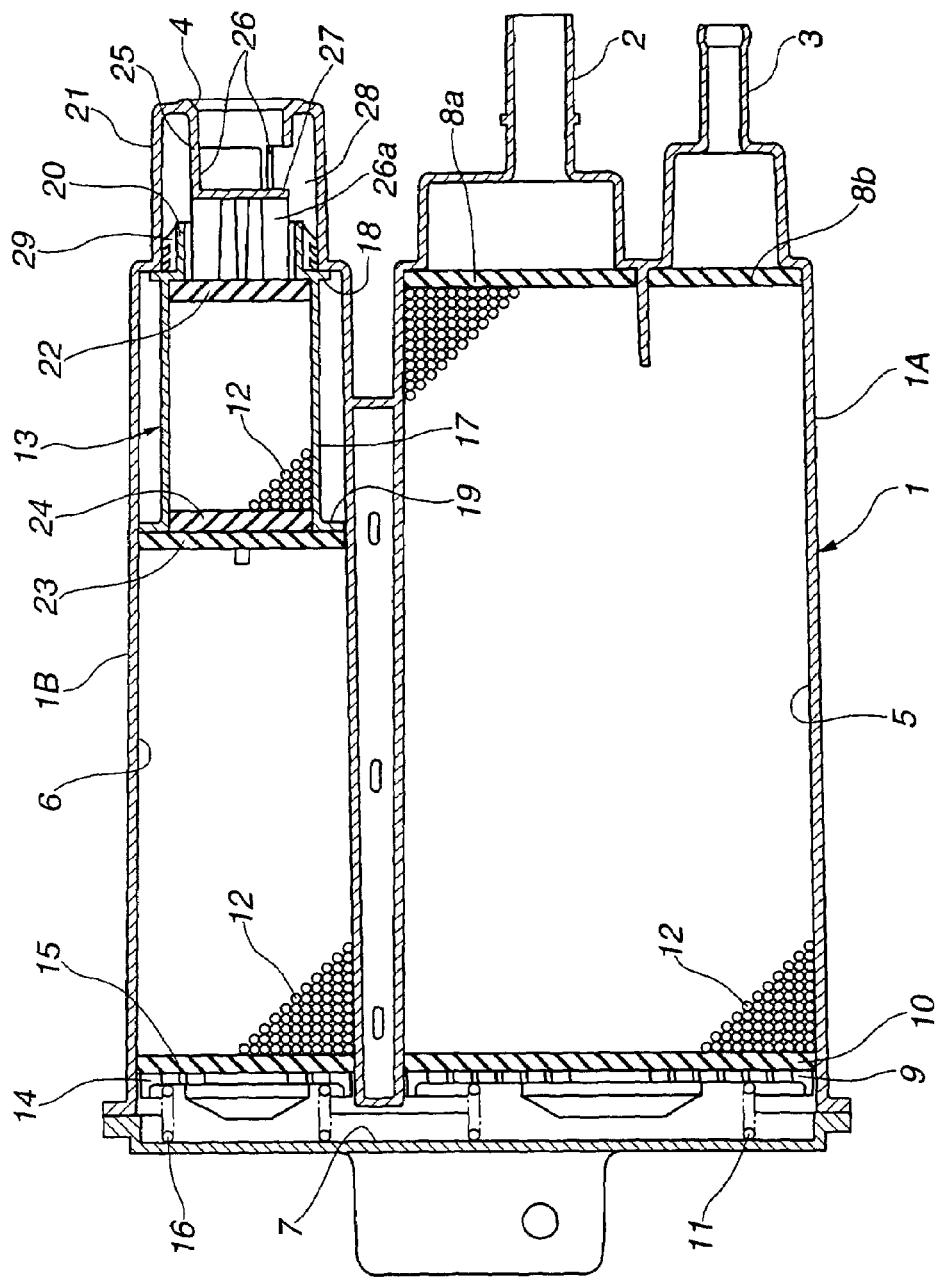
FIG. 1 is a vertical sectional view of a first embodiment of a fuel vapor treatment device according to the present invention.
Figure 2:
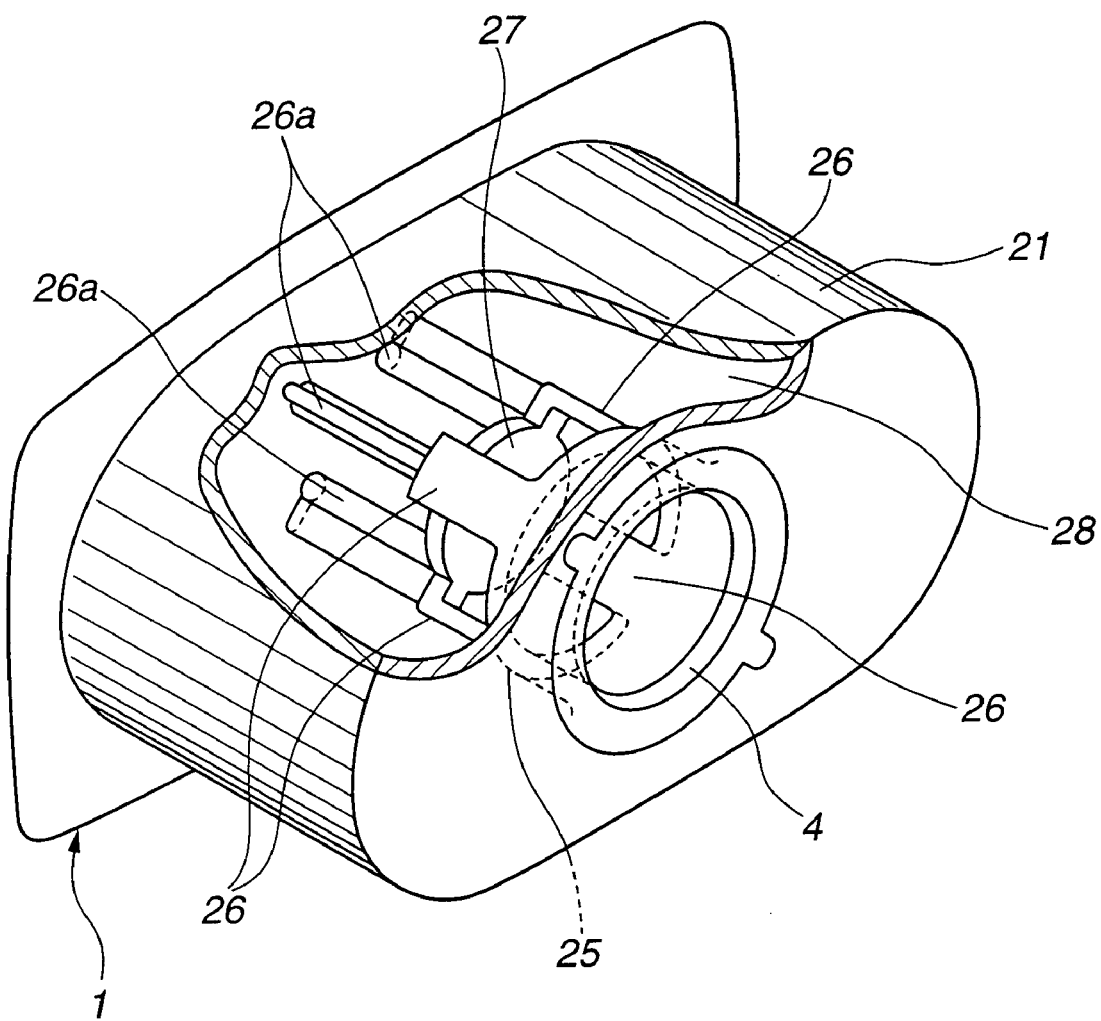
FIG. 2 is a fragmentary enlarged perspective view, partly in section, of an essential part of the fuel vapor treatment device of FIG. 1.
Figure 3:
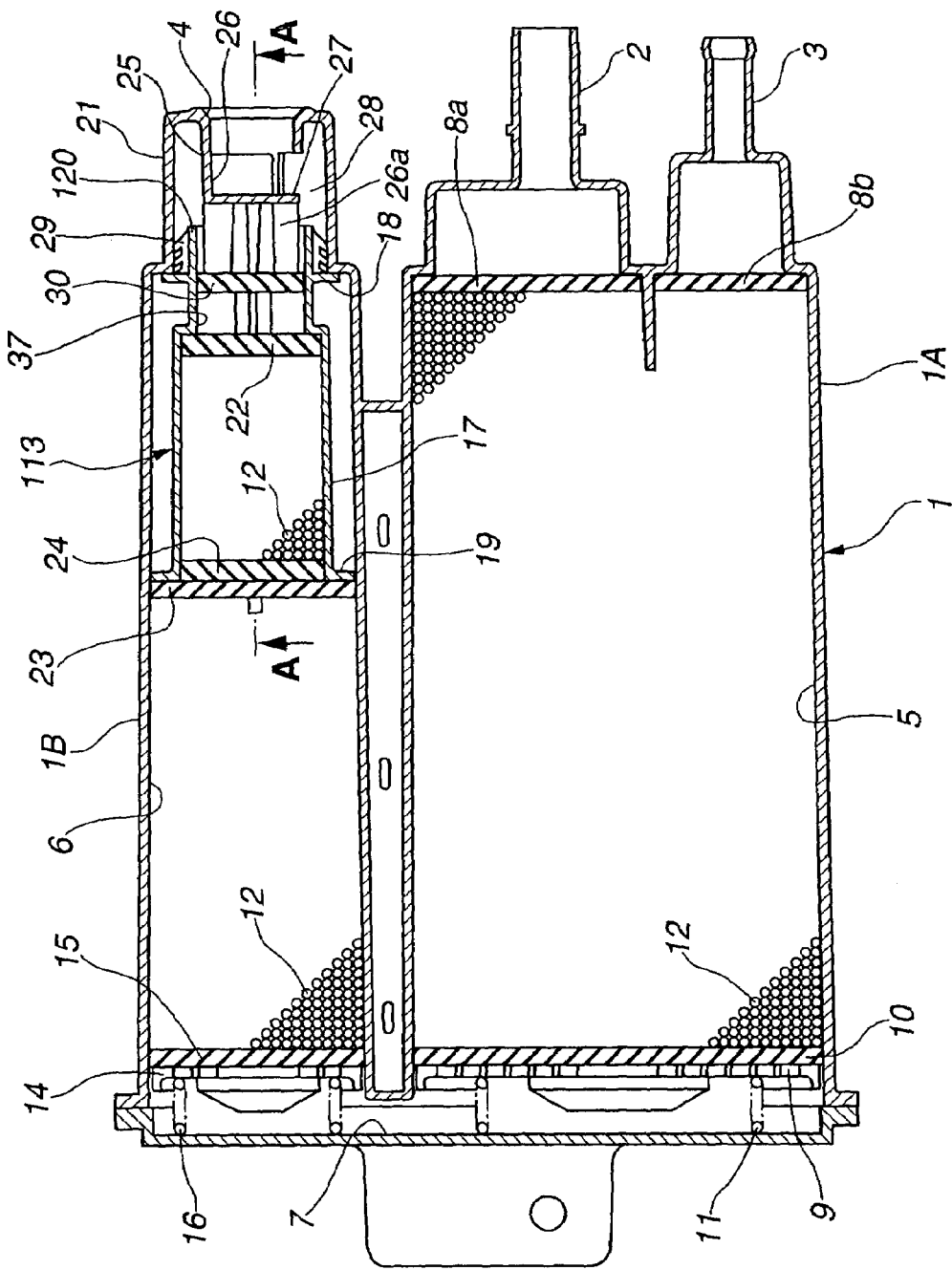
FIG. 3 is a vertical sectional view of a second embodiment of the fuel vapor treatment device according to the present invention.

Referring now to FIGS. 1 and 2, a first embodiment of a fuel vapor treatment device according to the present invention is illustrated. The vapor treatment device comprises casing 1 formed of a resin material (synthetic resin). Casing 1 is formed at its one end side with charge port 2, purge port 3 and atmospheric air port 4. Charge port 2 is connected to a fuel tank (not shown) of an automotive vehicle. Purge port 3 is connected to an intake side or system (not shown) of an internal combustion engine (not shown) of the vehicle. Atmospheric air port 4 is communicated with atmospheric air. The inside of casing 1 is divided into first charging chamber 5 and second charging chamber 6. In other words, casing 1 includes a first casing section 1A defining therein first charging chamber 5, and a second casing section 1B defining therein second charging chamber 6. First charging chamber 5 is communicated with charge port 2 and purge port 3. Second charging chamber 6 is communicated with atmospheric air port 4. Each of first and second charging chambers 5, 6 axially extend and has its first (right-side) and second (left-side) end sections (not identified). Charge port 2 and purge port 3 are located adjacent the first end section of first charging chamber 5. Atmospheric air port 4 is located adjacent the first end section of second charging chamber 6. As shown, the second end sections of first and second charging chambers 5, 6 are communicated through a communication passage 7 with each other. Second charging chamber 6 is formed having a cross-sectional area smaller than that of first charging chamber 5. The cross-sectional area of second charging chamber 6 is about ½ of the cross-sectional area of first charging chamber 5.

Filters 8a and 8b are disposed at the first end section of first charging chamber 5 and respectively positioned adjacent charge and purge ports 2, 3. Fuel vapor from charge port 2 is supplied through filter 8a into first charging chamber 5. Fuel vapor in first charging chamber 5 is purged through filter 8b from purge port 3. Filter 10 is disposed at the second end section of the first charging chamber 5 and supported by a porous plate 9 which is slidably fitted to the inner surface of first casing section 1A and biased in a direction of ports 2, 3 by spring 11. Activated carbon 12 serving as fuel vapor adsorbing material is filled in first charging chamber 5 and between aligned filters 8a, 8b and filter 10.

Adsorbing material cartridge or unit 13 is disposed at the first end section of the second fuel vapor charging chamber 6 and located adjacent atmospheric air port 4. Filter 15 is disposed at the second end section of the second charging chamber 6 and supported by a porous plate 14 which is slidably fitted to the inner surface of second casing section 1B and biased in a direction of atmospheric air port 4 by spring 16. Activated carbon 12 serving as fuel vapor adsorbing material is filled in second charging chamber 6 and between adsorbing material cartridge 13 and filter 15. Additionally, activated carbon 12 is also filled inside adsorbing material cartridge 13.

Adsorbing material cartridge 13 includes cylindrical cartridge main body section 17 in which activated carbon 12 is filled. Cartridge main body section 17 is integrally provided with first (right-side) flange 18 and second (left-side) flange 19. First flange 18 radially outwardly extends from first (right-side) end portion of cartridge main body section 17, and further radially inwardly extends from the first end portion of the cartridge main body section 17 to form an inner flange section (no numeral). Second flange 19 radially outwardly extends from second (left-side) end portion of cartridge main body section 17. Cylindrical wall section 20 is formed integral with the inner flange section and axially extends from the inner flange section of adsorbing material cartridge 13. Second casing section 1B includes a cylindrical wall section 21 which is formed integral with the main body of second casing section 1B and is smaller in cross-sectional area than the main body of second casing section 1B so that a generally annular step portion (no numeral) is formed between the main body of second casing section 1B and cylindrical wall section 21. First flange 18 of adsorbing material cartridge 13 is in contact with the step portion, and cylindrical section 20 of the cartridge is inserted inside the cylindrical wall section 21. Annular sealing member 29 is disposed around the outer peripheral surface of cylindrical wall section 20 so that gas tight seal is established between the outer peripheral surface of cylindrical section 20 and the inner peripheral surface of cylindrical wall section 21.

First (right-side) filter 22 is disposed inside cartridge main body section 17 and located at the first (right-side) end portion of cartridge main body section 17 in such a manner as to be in contact with the inner flange section. Accordingly, first filter 22 is located adjacent atmospheric air port 4 so that cylindrical section 20 is positioned between first filter 22 and atmospheric air port 4. Second (left-side) filter 24 is disposed inside cartridge main body section 17 and located at the second (left-side) end portion of cartridge main body section 17 in such a manner as to be in contact with filter 23 which is fixedly disposed inside second casing section 1B. Activated carbon 12 is filled between filters 22 and 23. Activated carbon 12 is filled also between filter 23 and filter 15. Filter 23 is welded to second flange 19 of cartridge main body section 17 thereby damming up and keeping activated carbon 12 in position.

Here, as shown in FIGS. 1 and 2, atmospheric air port is formed as a central opening at a tip end wall (no numeral) integrally formed at the tip end portion of the cylindrical wall section 21. The tip end wall of cylindrical wall section 21 is integrally provided with cylindrical boss section 25 located inside cylindrical wall section 21 for the purpose of piping-connection. Generally cup-shaped frame structure (no numeral) is integrally connected to the bottom portion of cylindrical boss section 25 and includes a plurality of axially extending frames or legs 26 which extend from the bottom portion of cylindrical boss section 25. A space is formed between adjacent frames 26 50 as to serve as a window through which gas flows. A baffle plate 27 is integrally connected to the tip end or bottom end of each frame 26 and located perpendicular to each frame 26. Additionally, a plurality of legs 26a axially extend from baffle plate 27 and located generally corresponding respectively to frames 26. In other words, each leg 26a is generally aligned with each frame 26 and inserted inside the cylindrical section 20 to be in contact with filter 22. Accordingly, atmospheric air from atmospheric air port 4 flows along boss section 25 and strikes against baffle plate 27, and then flows radially through the spaces each of which is formed between adjacent flames 26. Relatively large annular space 28 is formed around baffle plate 27. Accordingly, atmospheric air changed in its flow direction upon striking against baffle plate 27 flows through relatively large annular space 28 toward a space inside cylindrical section 20, and then flows through filter 22 into adsorbing material cartridge 13.

With the above fuel vapor treatment device of the first embodiment, fuel vapor generated during stopping of the vehicle is introduced through charge port 2 into the inside of the first and second casing sections 1A, 1B of casing 1. At this time, fuel component of fuel vapor is adsorbed by activated carbon 12 in first and second casing sections 1A, 1B while the remaining air is released through atmospheric air port 4 into atmospheric air. During operation of the engine of the vehicle, atmospheric air is introduced through atmospheric air port 4 into casing 1 and passes through activated carbon 12 in casing 1, and then sucked through purge port 3 into the engine. At this time, fuel (component) adsorbed in activated carbon 12 is purged under the action of air flow, and then is introduced through purge port 3 into the engine together with air so as to be combusted in the engine.

Here, during the above engine operation, atmospheric air sucked through atmospheric port 4 flows axially along boss section 25 and then strikes against baffle plate 27 to be changed in flow direction so as to generally radially flow. Accordingly, this atmospheric air is supplied to the space surrounding baffle plate 27 through the spaces each between adjacent frames 26 and therefore is sufficiently lowered in flow speed, striking against walls including cylindrical wall section 21. Thereafter, the atmospheric air is sucked through a space defined inside legs 26a extending from baffle plate 27 and passes through filter 22. At this time, dust contained in the atmospheric air is sufficiently reduced in speed together with the atmospheric air and strikes against the walls around baffle plate 27, so that most dust drops or adheres to the inner surface of the walls upon striking the walls.

Thus, the atmospheric air from which most dust has been removed is supplied to filter 22 of adsorbing material cartridge 13, so that the amount of dust sucked through filter 22 can be largely reduced. As a result, according to the fuel vapor treatment device of this embodiment, filter 22 cannot be clogged with dust even upon a long time use, thereby maintaining a required purge performance of the fuel vapor treatment device for a long period of time. Additionally, the dust removing effect of the fuel vapor treatment device due to baffle plate 27, annular space 28 and cylindrical wall section 21 can be hardly affected by the direction of gravity, so that the effect can be stably obtained regardless of the mounting or installation posture of the fuel vapor treatment device. Additionally, atmospheric air sucked through atmospheric air port 4 is changed in flow direction to generally radially flow upon striking baffle plate 27, and therefore uniformly flows throughout the almost whole surface of filter 22, thereby preventing a partial clogging from occurring in filter 22.

FIGS. 3 to 6 illustrate a second embodiment of the fuel vapor treatment device according to the present invention, which is similar to the first embodiment fuel vapor treatment device except for the structure of the adsorbing material cartridge (13). In this embodiment, the adsorbing material cartridge is designated by the reference numeral 113.

Figure 4:
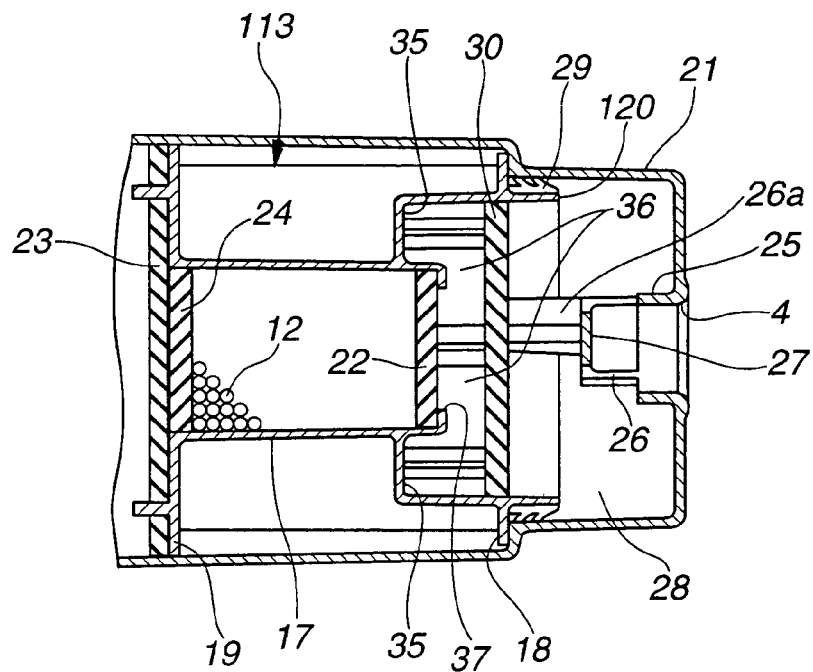
FIG. 4 is a fragmentary enlarged sectional view of an essential part of the fuel vapor treatment device, taken in the direction of the arrows substantially along the line A—A of FIG. 3.
Figure 5:
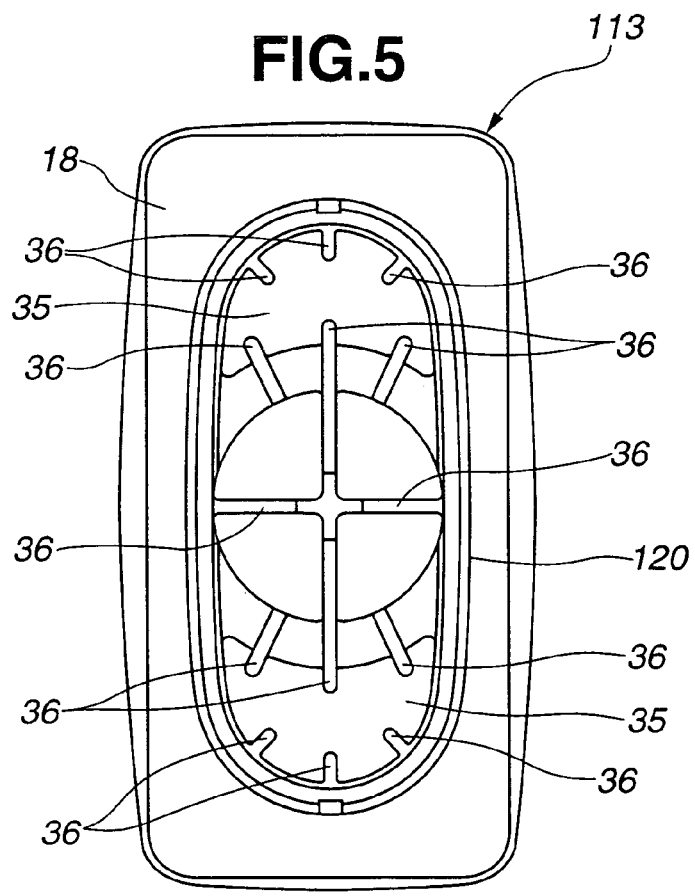
FIG. 5 is a front view of an adsorbing material cartridge used in the fuel vapor treatment device of FIG. 3.
Figure 6:
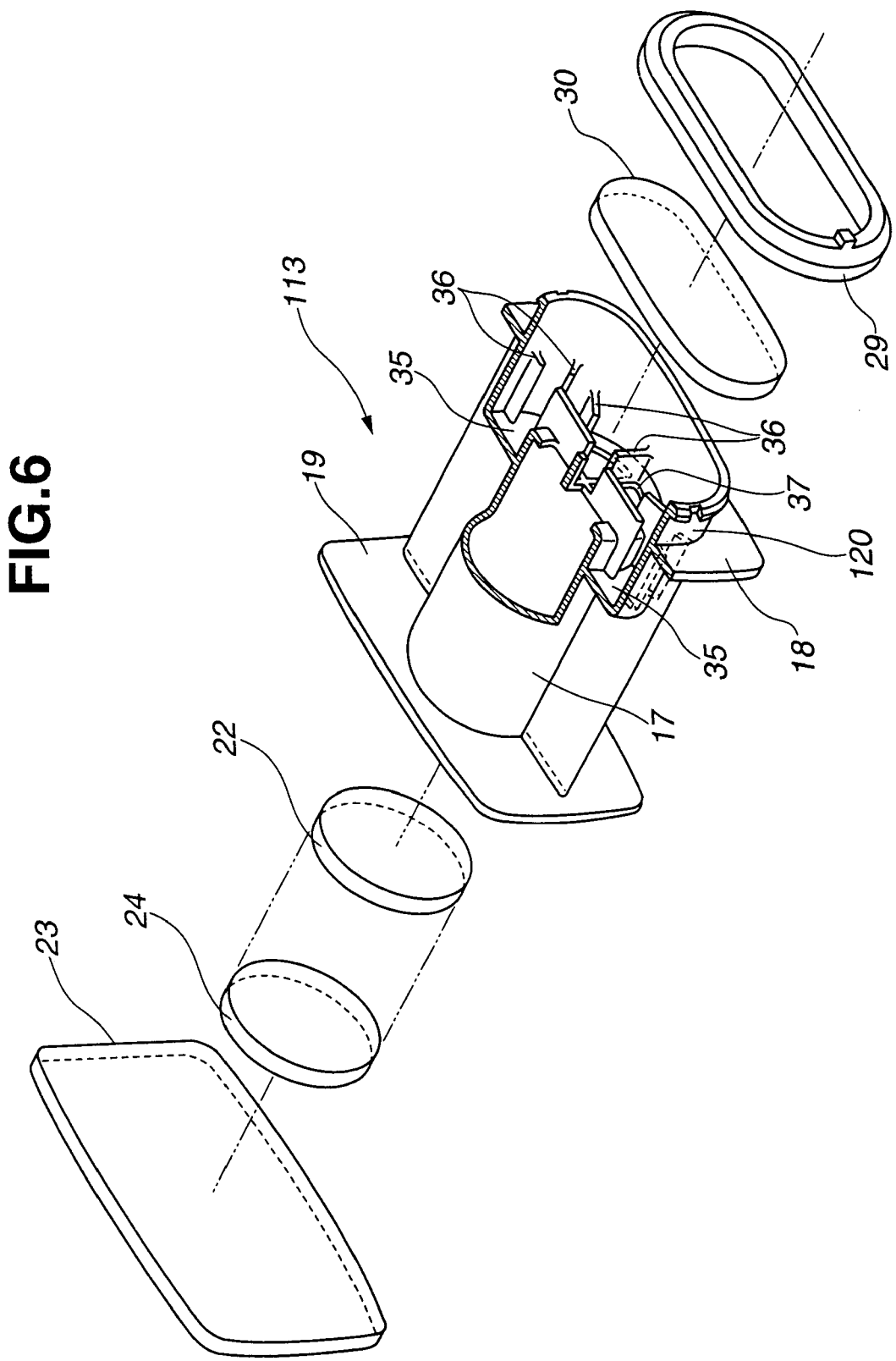
FIG. 6 is an exploded perspective view, partly in section, of the adsorbing material cartridge of FIG. 5.

As clearly shown in FIGS. 4 and 5, adsorbing material cartridge 113 includes main body section 17 which is integrally provided at its first (right-side) end portion with a bottom wall section (no numeral). The bottom wall section is oppositely outwardly extend from the outer peripheral surface of the main body section 17, defining depressions 35. Generally cylindrical wall section 120 is integrally connected to the bottom wall section in such a manner as to be perpendicular to the bottom wall section, and extends leftward in FIGS. 3 and 4 over first flange 18 into cylindrical wall section 21. In other words, cylindrical wall section 120 extends in opposite directions from first flange 18. A pre-filter 30 is disposed inside cylindrical wall section 120 and located at a generally axially intermediate position of cylindrical wall section 120 in such a manner as to be perpendicular to the axis of cylindrical wall section 120. Legs 26a extending from baffle plate 27 reach pre-filter 30. In this embodiment, first filter 22 disposed inside cartridge main body section 17 serves as "main filter" to pre-filter 30 and therefore refers hereinafter to as main filter. Pre-filter 30 is formed coarser than main filter 22, i.e., has an average pore size or diameter larger than that of main filter 22. Additionally, pre-filter 30 has an effective cross-sectional area larger than main filter 22. The effective cross-sectional area means an area in a plane perpendicular to the axis of the filter which area is practically effective for filtering dust, in which the plane is substantially parallel with opposite flat surfaces of the filter.

As shown in FIG. 4, the first (left-side) end portion of cartridge main body section 17 extends over the bottom wall section integral with cylindrical wall section 120, so that the depressions 35 are formed on the opposite sides of the first end section of cartridge main body section 17 and of main filter 22. These depressions 35 serve as dust retaining chambers contiguous with a space between pre-filter 30 and main filter 22. As clearly shown in FIGS. 5 and 6, the cylindrical wall section 120 has a generally oval-shaped cross-section so as to have semicylindrical portions at its opposite ends. Each semicylindrical portion defines each depression 35. A plurality of fins 36 integral with the cylindrical wall section 120 extend in the axial direction of cylindrical wall section 120 i.e., in the direction of from bottom wall section 35 toward pre-filter 30 to support pre-filter 30. More specifically, fins 36 adjacent first (left-side) end opening 37 for main filter 22 are arranged radially as seen from the axial direction of cylindrical wall section 120. Fins 36 formed at the inner peripheral surface of the semicylindrical portions of cylindrical wall section 120 are arranged to extend in the direction of normal line as seen from the axial direction of cylindrical wall section 120, and axially extend to and integral with the bottom wall section.

With the fuel vapor treatment device of the second embodiment, it will be understood that the same effects as those in the first embodiment can be basically obtained. Additionally, since pre-filter 30 is disposed on the side of atmospheric air port 4 relative to main filter 30 through the space in the cylindrical wall section 120, dust sucked through together with atmospheric air through atmospheric air port 4 can be trapped by the two-stage filters (or pre-filter 30 and main filter 22) during operation of the engine. Additionally, pre-filter 30 disposed upstream of main filter 22 is coarser (larger in average pore size or diameter) than main filter 22, and has the effective cross-sectional area larger than main filter 22. Consequently, larger diameter dusts are trapped by pre-filter 30 while smaller diameter dusts are trapped by main filter 22, so that dusts to be trapped are dispersed to pre-filter 30 and main filter 22. As a result, in the fuel vapor treatment device of this embodiment, it can be prevented that either one of filters 30, 22 is largely clogged, thereby stably maintaining required performances of the fuel vapor treatment device for a long period of time. While pre-filter 30 has been described as being coarser (larger in average pore size or diameter) than main filter 22, it will be understood that pre-filter 30 may be the same in coarseness (or average pore size) as main filter 22.

In this embodiment, dust retaining chamber 35 is formed around main filter 22 in such a manner as to be contiguous with the space between main filter 22 and pre-filter 30, most dust passed through pre-filter 30 during engine operation can be retained inside dust retaining chamber 35 without being trapped by main filter 22. Particularly, dust retaining chamber 35 is formed depressed relative to a plane for installing main filter 22, dust in atmospheric air flowing through pre-filter 30 and along the inner peripheral wall of cylindrical wall section 120 drifts in dust retaining chamber 35. Accordingly, dust entering dust retaining chamber 35 can be securely retained in position without being sucked into main filter 22 under the action of flow of sucked atmospheric air.

Furthermore in this embodiment, plural fins 36 are formed at the inner peripheral surface of cylindrical wall section 120 in such a manner as to be generally perpendicular to the inner peripheral surface, and therefore atmospheric air which flows in swirling along the inner peripheral surface of cylindrical wall section 120 strikes generally perpendicularly against fins 36. As a result, flow speed of atmospheric air is reduced upon striking of the atmospheric air against fins 36, so that dust containing in the atmospheric air adheres to fins 36 or drops thereby making it possible to readily remove the dust. Moreover in this embodiment, plural fins 36 are similarly disposed and radially arranged adjacent end opening 37 of cartridge main body section 17, the same effects can be obtained by such fins 36. Additionally, above fins 36 also function as reinforcing ribs for increasing the strength of the wall of absorbing material cartridge 113 which is constituted of thin walls of synthetic resin, and as a restricting section for restricting deflection of main filter 22 on the side of pre-filter 30. In this connection, legs 26a extending from frames 26 which extend from the bottom of cylindrical boss section 25 functions as a restricting section for restricting deflection of pre-filter 30 on the side of atmospheric air port 4.

Figure 7:
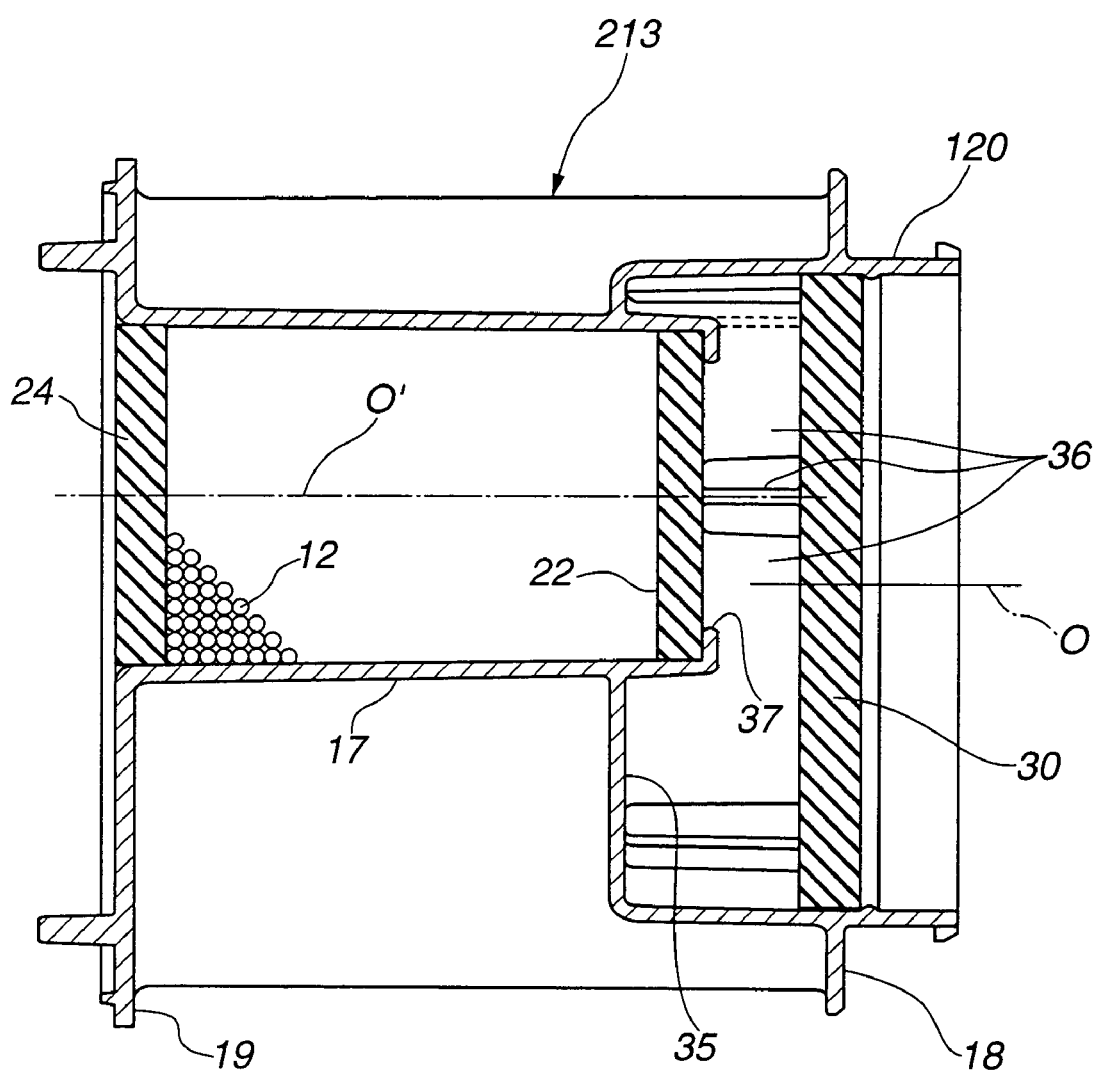
FIG. 7 is a vertical sectional view of an adsorbing material cartridge used in a third embodiment of the fuel vapor treatment device according to the present invention.
Figure 8:
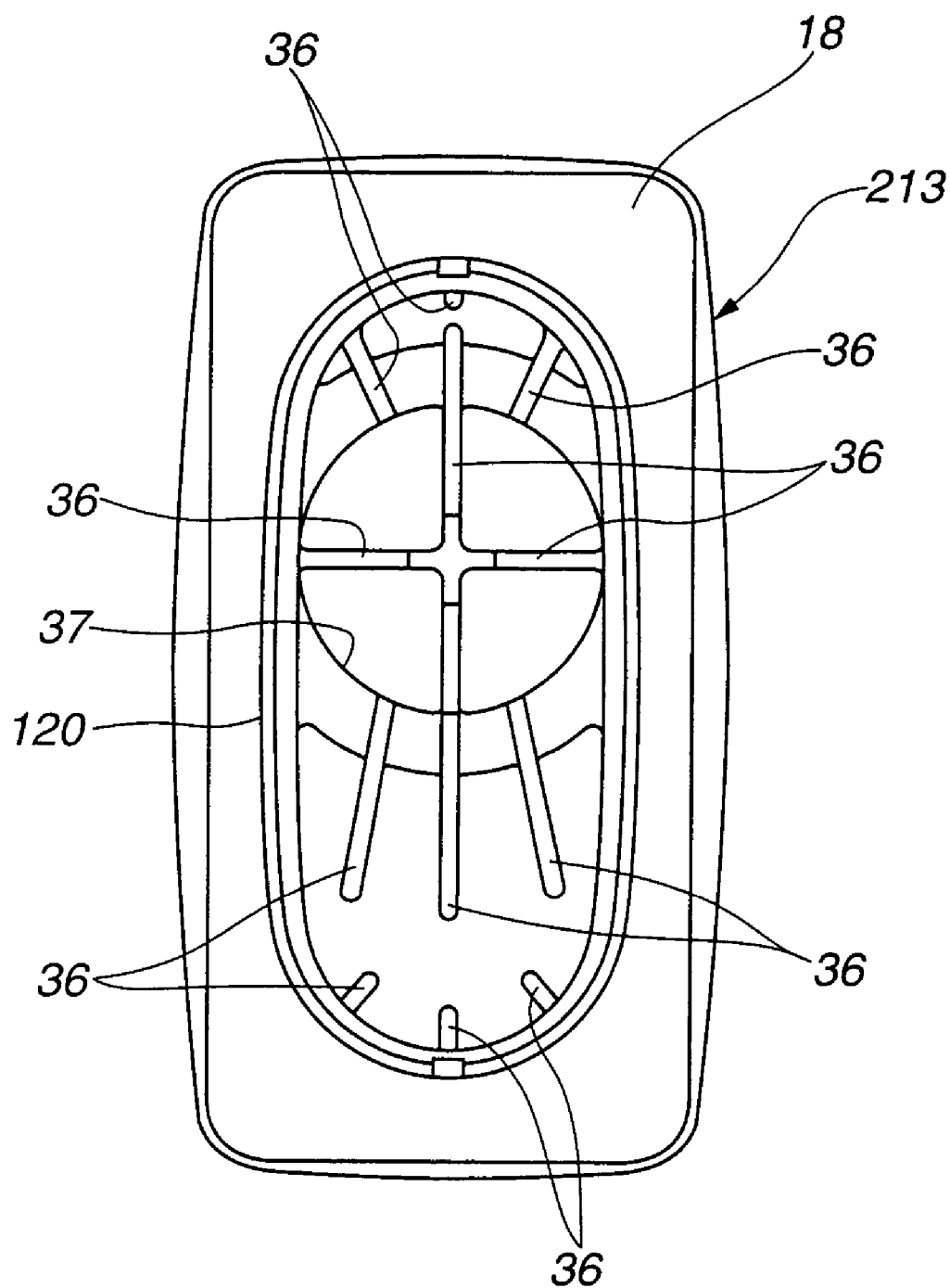
FIG. 8 is a front view of the adsorbing material cartridge of FIG. 7.

FIGS. 7 and 8 illustrate a third embodiment of the fuel vapor treatment device according to the present invention, which is similar to the second embodiment fuel vapor treatment device except for the locational relationship of pre-filter 30 and main filter 22. This embodiment is the same as the second embodiment in such a point that pre-filter 30 is coarser (larger in average pore size or diameter) than or equal in coarseness to main filter 22 and has the effective cross-sectional area larger than main filter 22. In this embodiment, the absorbing material cartridge is designated by the reference numeral 213.

In absorbing material cartridge 213 of this embodiment, cartridge main body section 17 is located one-sided in such a manner that the axis of cartridge main body section 17 is offset from the axis of absorbing material cartridge 213 in a longitudinal direction of generally rectangular first and second flanges 18, 19. Accordingly, the center axis O' of main filter 22 is offset from the center axis O of pre-filter 30. With this one-sided cartridge main body section 17, one side of dust retaining chamber 35 is enlarged, and the enlarged side of dust retaining chamber 35 is largely overlapped with pre-filter 30.

With the thus arranged embodiment, the center axis O' of main filter 22 and the center axis O of pre-filter 30 are offset from each other, and therefore dust passing through pre-filter 30 becomes difficult to be directly sucked into main filter 22, so that the dust strikes against walls and fins 36 other than main filter 22 and drops, thereby increasing the possibility of the dust adhering to the walls and/or fins. This can further securely prevent main filter 22 from being clogged.

As appreciated from the above, with the fuel vapor treatment device according to the present invention, atmospheric air flowing from the atmospheric air port is changed in its flow direction into a generally radial direction under the action of the baffle plate, and the thus direction-changed flow of the atmospheric air strikes against the inner surface of the cylindrical wall section upon being lowered in its flow speed under the action of the annular space having a relatively large volume. Accordingly, most dust contained in the atmospheric air can be securely removed prior to being sucked into the filter. Additionally, the atmospheric air flowing through the atmospheric air port strikes against the baffle plate to be spread generally radially and thereafter sucked through the filter, so that the atmospheric air is spread and sucked throughout the almost whole surface of the filter. This effectively prevents the filter from being partially clogged with dust. As a result, according to the present invention, the filter in the fuel vapor treatment device can be effectively prevented from being clogged thereby maintaining the performance of the device throughout a long time use without being affected by its install posture.

The entire contents of Japanese Patent Application P2002-222763 (filed Jul. 31, 2002) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A fuel vapor treatment device comprising:
   a casing having a charge port connected to a fuel tank, a purge port connected to an intake side of an engine, and an atmospheric air port through which atmospheric air is introduced;
   fuel vapor adsorbing material filled in the casing;
   a filter disposed in the casing and between the atmospheric air port and the fuel vapor adsorbing material to trap dust contained in atmospheric air; and
   a baffle plate disposed in the casing and between the atmospheric air port and the filter, and located generally parallel with a surface of the filter which surface faces the baffle plate so that atmospheric air introduced through the atmospheric air port strikes against the baffle plate to change its flow into a generally radial direction, the baffle plate being free of holes, wherein an annular space is formed around the baffle plate so that atmospheric air from the baffle plate flows through the annular space to the filter.

2. A fuel vapor treatment device as claimed in claim 1, wherein the filter includes a pre-filter and a main filter which are arranged in series with each other, the pre-filter being located nearer to the baffle plate than the main filter, the pre-filter having an effective cross-sectional area which is not smaller than an effective cross-sectional area of the main filter.

3. A fuel vapor treatment device as claimed in claim 1, wherein the filter includes a pre-filter and a main filter which are arranged in series with each other, the pre-filter being located nearer to the baffle plate than the main filter, the pre-filter being coarser than the main filter.

4. A fuel vapor treatment device as claimed in claim 2, wherein the pre-filter and the main filter are separate from each other to define a space therebetween, wherein a wall section is formed outside and spaced from the main filter to define a dust retaining chamber contiguous with the space which dust retaining chamber retains dust in atmospheric air passed through the pre-filter.

5. A fuel vapor treatment device as claimed in claim 3, wherein the pre-filter and the main filter are separate from each other to define a space therebetween, wherein a wall section is formed outside and spaced from the main filter to define a dust retaining chamber contiguous with the space, which dust retaining chamber retains dust in atmospheric air which has passed through the pre-filter.

6. A fuel vapor treatment device as claimed in claim 4, wherein fins are formed at a surface of the wall section defining the dust retaining chamber, the fins extending into the dust retaining chamber.

7. A fuel vapor treatment device as claimed in claim 5, wherein fins are formed at a surface of the wall section defining the dust retaining chamber, the fins extending into the dust retaining chamber.

8. A fuel vapor treatment device as claimed in claim 2, wherein the main filter has a center axis which is offset from a center axis of the pre-filter.

9. A fuel vapor treatment device as claimed in claim 3, wherein the main filter has a center axis which is offset from a center axis of the pre-filter.

10. A fuel vapor treatment device as claimed in claim 1, wherein the casing includes a cylindrical wall section having a first end portion formed with the atmospheric air port, and a second end portion integral with a main body of the casing, the filter being sealingly disposed adjacent the second end portion and located perpendicular to an axis of the cylindrical wall section, wherein the baffle plate is disposed inside the cylindrical wall section and located spaced from an inner peripheral surface of the cylindrical wall section to define a generally annular space around the baffle plate, the baffle plate being perpendicular to the axis of the cylindrical wall section and separate from the filter to define a space which is contiguous with the generally annular space.

11. A fuel vapor treatment device as claimed in claim 1, wherein the atmospheric air port, the baffle plate and the filter have respective axes which are generally aligned with each other.

12. A fuel vapor treatment device as claimed in claim 1, further comprising a wall disposed around the baffle plate, the baffle plate being generally perpendicular to the wall, the wall being located so near the baffle plate that atmospheric air from the baffle plate strikes against the wall to separate dust contained in atmospheric air.

13. A fuel vapor treatment device as claimed in claim 1, further comprising an air guide defining a space communicating the atmospheric air port, the air guide guiding atmospheric air introduced through the atmospheric air port toward the baffle plate.

* * * * *